Feb. 6, 1962 E. J. STOCKWELL 3,020,005
CATAPULT LAUNCHING DIRECTION AND POSITION INDICATOR
Filed Aug. 30, 1960 3 Sheets-Sheet 1

Inventor
EPHRIAM J. STOCKWELL
By W. O. Quisenberry
Claude Funkhouser
Attorneys

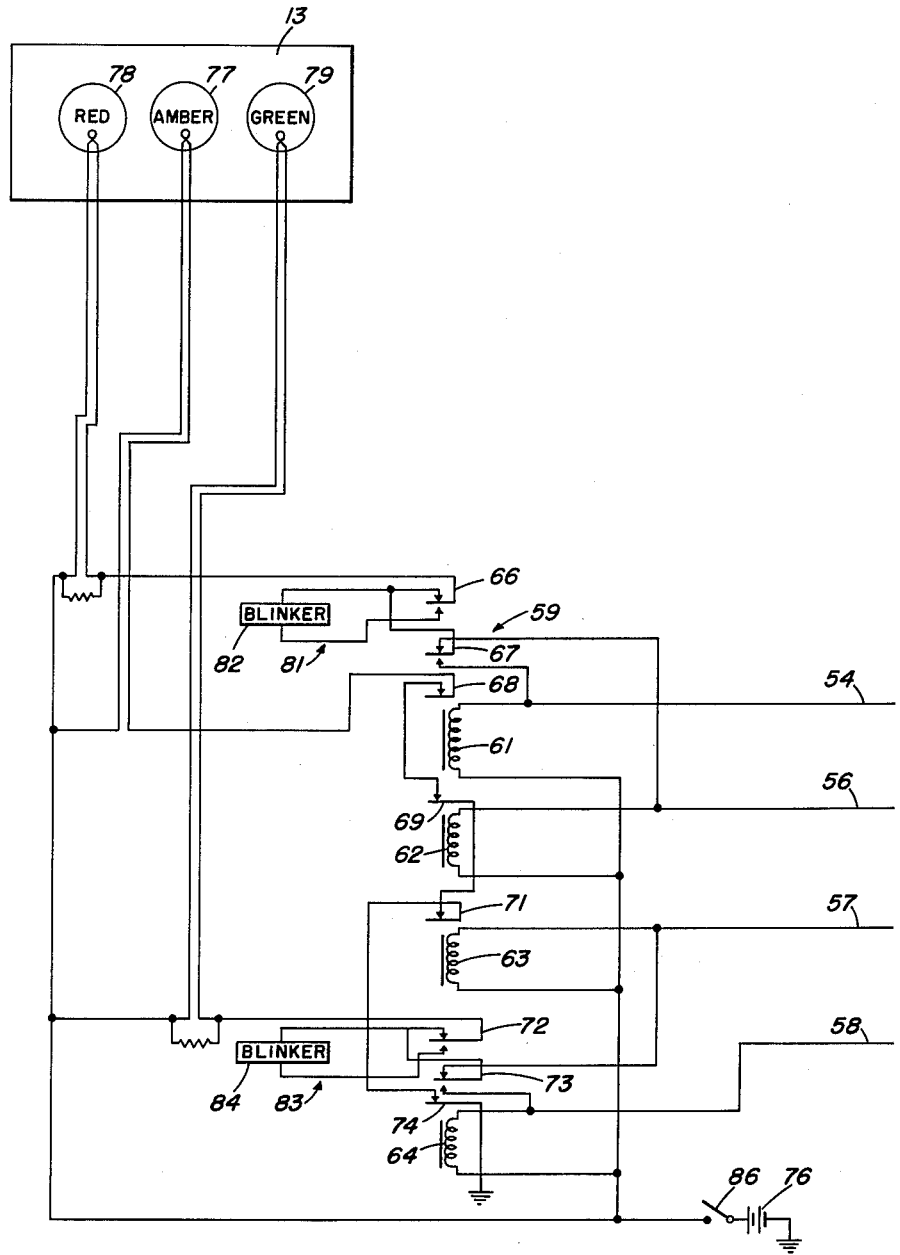

EPHRIAM J. STOCKWELL

United States Patent Office 3,020,005
Patented Feb. 6, 1962

3,020,005
CATAPULT LAUNCHING DIRECTION AND POSITION INDICATOR
Ephriam J. Stockwell, McKays Beach, Leonardtown, Md.
Filed Aug. 30, 1960, Ser. No. 53,016
10 Claims. (Cl. 244—63)
(Granted under Title 35, U.S. Code (1952), sec. 266)

The invention described herein may be manufactured and used by or for the Government of the United States of America for governmental purposes without the payment of any royalties thereon or therefor.

The present invention relates to a catapult launching system and more particularly to a direction and position indicator system located aft of a catapult shuttle so that an aircraft approaching the shuttle might be accurately aligned therewith.

The present method for directing and positioning aircraft on catapults, either aboard an aircraft carrier or on test strips on air stations, is hand signals given to the pilot by a designated person standing forward of the aircraft. Depending on the individual, the signals can mean a variety of different things and quite often result in the nose gear of the aircraft missing the shuttle of the catapult. In the case of smaller aircraft, 20 or 30 men can be summoned to push the aircraft back so that the aircraft might be repositioned over the shuttle.

In the case of larger aircraft, a pilot must expend considerable fuel to turn in the narrow radius of the flight deck, move aft on the flight deck, turn and attempt again to properly position the aircraft. Other disadvantages of this maneuver are that other aircraft in the way must be moved and the flight deck cannot be utilized while the maneuver is proceeding. Thus, other aircraft with additional catapult shots to make must either make touch-and-go's or take wave-offs, using up more fuel.

Night operations are even more difficult in that the shuttle is almost impossible to see from the pilot's seat and signals are given by waving a light.

The general purpose of the present invention is to eliminate these difficulties by providing a position and direction indicator system in conjunction with a catapult system. The indicator system contemplates the use of a pressure sensitive network located aft of the catapult shuttle which is correlated with pressure switches, a relay and blinker circuit and a light console.

An object of the present invention is the provision of a pressure switch network and electrical circuitry to locate a plane over a catapult shuttle.

Another object is to provide a launching system whereby an aircraft is semi-automatically aligned with the shuttle line of traffic.

A further object of the invention is to eliminate human error in directing a plane into position over a catapult shuttle.

Still another object of the invention is to eliminate large ground crews or high gasoline consumption by maneuvering craft.

Other objects and many of the attendant advantages of this invention will be readily appreciated as the same becomes better understood by reference to the following detailed description when considered in connection with the accompanying drawings wherein:

FIGS. 2a and 2b show a wiring diagram of the electrical signal console which will be positioned forwardly of the catapult shuttle to control the alignment of an aircraft in the manner desired.

Figure 1:
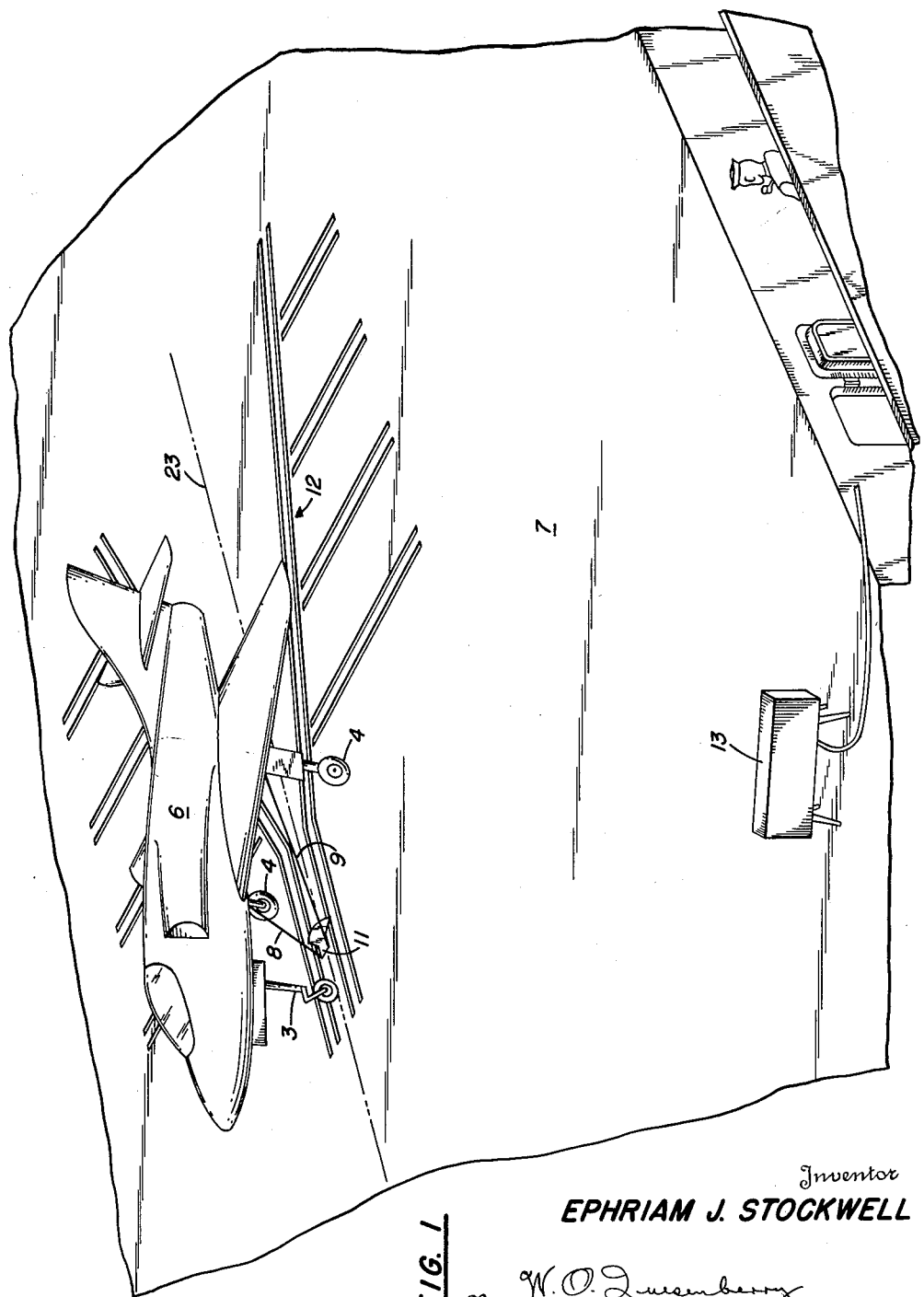
FIG. 1 shows an overall view of a preferred embodiment of the invention in its operating environment.

Referring now to the drawings wherein like reference characters designate like or corresponding parts throughout the several views, there is shown in FIG. 1 an aircraft 6 in a launch position on a deck 7. Yoke arms 8 and 9 are attached to a catapult shuttle 11 and a pressure line network 12 is shown located aft of the catapult shuttle. An indicator light console 13 is mounted in the forward field of vision of a pilot located in aircraft 6. The pressure line network 12 and light console 13 are connected to an electrical circuit which is illustrated in FIGS. 2a and 2b.

Figure 2B:
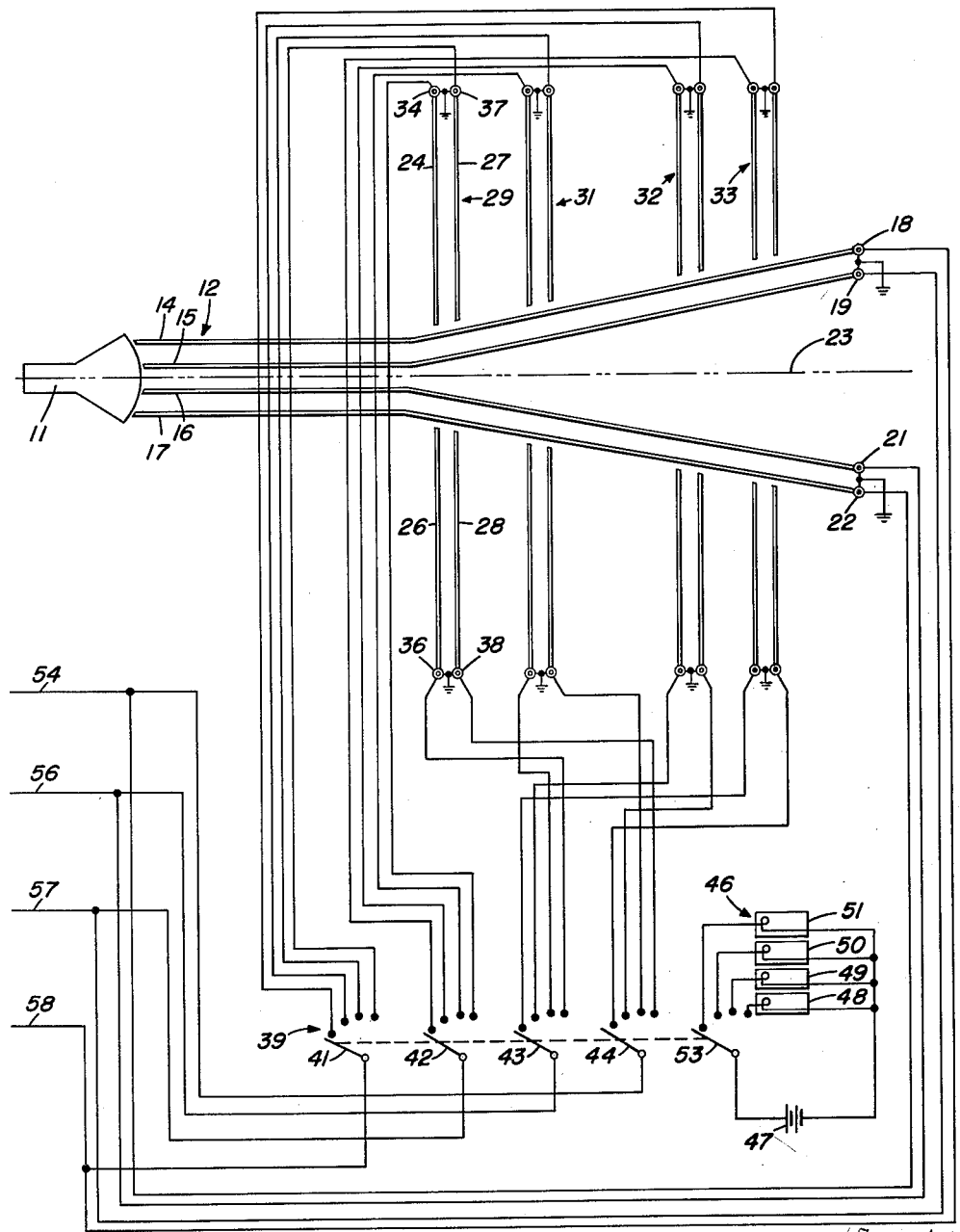

Referring now to FIGS. 2a and 2b, catapult shuttle 11 is located forwardly of longitudinal pressure lines 14, 15, 16, and 17 which lines run parallel immediately aft of catapult shuttle 11 and then diverge to form a V-shaped pattern. Longitudinal pressure lines 14, 15, 16, and 17 terminate at pressure actuated switches 18, 19, 21, and 22 respectively. Lines 14, 15, 16, and 17 are hydraulic hoses which will deform to increase pressure therein and consequently close pressure switches 18 through 22. Closing these switches will actuate an indicator light to give a pilot an indication of whether he is right or left of the catapult shuttle center line 23. Running transverse to center line 23 are four pairs of pressure lines 29, 31, 32, 33 on each side of the longitudinal lines 14 through 17. Each pair of lines indicates the longitudinal position of a plane approaching catapult shuttle 11. For instance transverse pressure lines 24, 26, 27, and 28 locate one particular aircraft model longitudinally so that yoke arms 8 and 9 are in position to be directly attached to catapult shuttle 11. A second, third, and fourth set of pairs, 31, 32, and 33 respectively are located aft of the first pair 29. Pressure lines 24, 26, 27, and 28 terminate in pressure actuated switches 34, 36, 37, and 38 respectively. Each other transverse pair of pressure lines terminate at similar pressure actuated switches. When a plane approaches its proper longitudinal position its aft wheels will actuate its respective transverse pressure lines to close a given pressure switch which will actuate an indicator light to inform a pilot that the aircraft is properly positioned in a longitudinal direction. Thus, it is apparent that a pilot receives an indication of both his transverse and longitudinal position as his plane crosses over pressure line network 12.

The system is adapted for a particular aircraft by closing a selector switch 39 which has four contacts 41, 42, 43, 44 which connect any one of the four pairs of transverse pressure lines and their respective pressure switches with the remainder of the indicating system depending upon which one of the four positions is selected. A selector indicator panel 46 having a current source 47 and four panel lights 48, 49, 50, and 51 connected across the current source is operatively associated with the indicator system so that a fifth contact 53 on the selector switch 39 will light any one of the aforesaid lights to give a panel indication that the system is adapted to receive a particular aircraft depending upon which position is selected.

Separate lead lines 54, 56, 57, and 58 connect contacts 41 through 44 with a relay circuit 59 having relays 61, 62, 63, and 64. Relay 61 controls three switches 66, 67, and 68. Relay 62 controls switch 69 and relay 63 controls switch 71. Similarly, relay 64 controls three switches 72, 73, and 74. In FIG. 2a the relays are shown in a de-energized state. Under this condition switches 68, 69, 71, and 74 are closed which completes the circuit between a current source 76 in the relay circuit and ground so that an amber light 77 in light console 13 is illuminated.

In the energized position when longitudinal pressure switches 19, 21 and transverse pressure switches 34, 36 are closed and the selector switch is positioned so that panel light 48 is illuminated a red or green steady light 78 and 79 respectively will be illuminated on the indicator light console 13 depending upon which one of the pressure switches is closed. Similar pressure switches are connected to the second, third, and fourth pairs of transverse pressure lines 31, 32, and 33. These switches are operable when panel lights 49, 50, and 51 are illuminated, respectively.

When relay 61 is energized, switch 66 is moved to close a circuit 81 in which blinker 82 is located and when relay 64 is energized, switch 72 is moved to close a circuit 83 in which blinker 84 is located. The circuits 81 and 83 are then connected in series with the red and green indicator lights respectively. Consequently, when longitudinal pressure switches 18, 22 and transverse pressure switches 37 and 38 are closed and the selector switch is positioned so that panel light 48 is illuminated a red or green flashing light will be displayed on the indicator light console 13 depending upon which one of the pressure switches 18 or 22 is closed. If pressure switches 37 and 38 are closed, a flashing red and green signal is displayed. Similar pressure switches are connected to the second, third and fourth pairs of transverse pressure lines 31, 32, and 33. These switches are operable when panel lights 49, 50, and 51 are illuminated, respectively.

Amber light 77 is off if any of the pressure switches are closed since this will open either switch 68, 69, 71 or 74. The relay circuit 59 is initially made operable by closing switch 86.

The operation of the device follows: Transverse positioning is first considered. Switch 86 is closed and the selector switch 39 is positioned according to the type aircraft being launched so that panel light 48 is illuminated. Thus, assuming an F11F aircraft is being launched, only the first pair of transverse pressure lines 29 and their respective pressure switches are operable for indicating longitudinal position. While the aircraft approaches the pressure line network 12, the amber light 77 on the indicator light console will be illuminated.

If in approaching the catapult shuttle 11 the aircraft is too far right, its nose wheel 3 will roll onto longitudinal pressure line 14. This will actuate pressure switch 18 and energize the relay 64 placing blinker circuit 83 in series with green light 79 so that a flashing green light will be displayed on console 13. When relay 64 is energized, amber light 77 is no longer illuminated since switch 74 is open. As the aircraft is turned to approach center line 23, nose wheel 3 will roll onto longitudinal pressure line 15 and off line 14. Thus, switch 18 opens and switch 19 closes. With switch 19 closed relay 63 is energized opening switch 71 and thereby shutting off amber light 77. Since relay 64 is de-energized, switches 72 and 73 are positioned so that green blinker circuit 83 is bypassed. Thus, a steady green light is displayed on the console 13. The steady green light indicates that the plane is approaching the desired center line approach. As the nose wheel 3 nears the center line, switch 19 opens and the steady green indication will be extinguished and the amber light 77 will glow again. A similar sequence of flashing to steady indication will appear on the console 13 if the aircraft approaches from the left but in this case a red light will be displayed. Once having approached center line 23 so as to receive an amber signal in the parallel section of the longitudinal lines, if the nose wheel 3 should go either to the right or left, the position will be indicated by the amber indication immediately extinguishing, and the red or green indicator (depending on direction) lighting, signaling the pilot which way to turn.

Once having aligned the aircraft in the transverse direction it must further be aligned in a longitudinal direction so that yoke arms 8 and 9 might be easily attached to catapult shuttle 11. Each type aircraft has a particular longitudinal position for catapulting and must be so aligned. This position is determinable from the distance between the nose wheel and the aft wheels, illustrated in FIG. 1 as 3 and 4 respectively. The transverse pressure lines and switches are positioned so that as the nose wheel 3 rolls over shuttle 11 the aft wheels contact transverse pairs 29, 31, 32, and 33. As was pointed out above, only one pair is operable depending upon what type of aircraft is being aligned. For example, if pair 29 is selected, panel light 48 will be illuminated. As the aircraft approaches its correct longitudinal position, the aft wheels will cross pressure lines 27 and 28 thus closing pressure switches 37 and 38 and a flashing red and green signal will appear on console 13. As the aircraft nears the correct longitudinal position the aft wheels 4 will leave pressure lines 27 and 28 and cross lines 24 and 26 thus closing pressure switches 34 and 36. This causes the flashing red and green signal to become a steady red and green signal. When the plane is correctly positioned, the aft wheels just clear lines 24 and 26 whereby the pressure switches are open and a steady amber light signal appears.

Alternate methods of construction include installation on top of a flight deck with the hose and switches fastened to the deck. The installation could also be built into the deck or made mobile and used to position aircraft on a flight deck, hanger deck, or other runways. The indicator light console 13 can be built at the side of the flight deck (starboard or port) in view of the pilot and in a manner that it can be swung or positioned clear of the flight deck. It could also be recessed into the deck or be made portable.

The advantages of the aforesaid system are that the red, green, and amber indicators can only be interpreted in one manner and in this way are more advantageous than the signals given by a human indicator which might change with day or night trials, the weather, or by mood.

Obviously many modifications and variations of the present invention are possible in the light of the above teachings. It is therefore to be understood that within the scope of the appended claims the invention may be practiced otherwise than as specifically described.

What is claimed is:

1. In launching apparatus for launching aircraft, a catapult shuttle, pressure sensing means located aft of said shuttle and to be activated by the aircraft, electrical circuit means operatively associated with said pressure sensing means, and a direction position indicator means operatively associated with said circuit means whereby an aircraft approaching said shuttle is directed to a position over said catapult.

2. In launching apparatus for launching aircraft, a catapult shuttle, longitudinal pressure sensitive means for locating the transverse location with respect to the center line of said shuttle of an aircraft located aft of said shuttle, transverse pressure sensitive means for locating the longitudinal location with respect to said shuttle of an aircraft located aft of said shuttle, both the longitudinal and transverse pressure sensitive means being activated by the aircraft, electrical circuit means operatively associated with said longitudinal and transverse pressure sensing means, and an indicator light console operatively associated with said circuit means whereby an aircraft approaching said shuttle is directed to a position over said catapult.

3. In a launching system as claimed in claim 1 wherein said pressure sensitive means comprises longitudinal and transverse means, a plurality of signal indicators, electrical circuit means for operatively connecting the longitudinal and transverse means with the signal indicators, said longitudinal pressure sensitive means being a first pressure hose which when compressed by an approaching aircraft's nose wheel will initiate a flashing green signal to indicate the plane is too far right, a second pressure hose which when compressed by said nose wheel will initiate a steady green signal to indicate the plane is approaching an on-center position, said transverse pressure sensitive means being a first pair of pressure hoses, and a second pair of pressure hoses located forwardly of said first pair, so that an approaching plane's aft wheels will first compress said first pair and thereby initiate a flashing red and green signal to indicate the plane is approaching its correct longitudinal position and as the plane continues to move forward said aft wheels will run off said first pair and compress said second pair and thereby initiate a steady red and green signal to indicate the plane is approximately correctly positioned in a longitudinal direction.

4. In launching apparatus for launching aircraft, a catapult shuttle located in a deck, longitudinal pressure hoses mounted on said deck aft of said shuttle for locating the transverse location of an aircraft with respect to the centerline of said shuttle, transverse pressure hoses mounted aft on said deck perpendicular to the center line of said shuttle for locating the longitudinal location of an aircraft with respect to said shuttle, pressure actuated switches connected to each of said hoses, electrical circuit means operatively associated with said pressure actuated switches, and an indicator light console operatively associated with said circuit means whereby an aircraft approaching said shuttle is directed to a position over said catapult.

5. In launching apparatus for launching aircraft, a catapult shuttle located in a deck, longitudinal pressure hoses mounted on said deck aft of said shuttle for locating the transverse location of aircraft with respect to the centerline of said shuttle, a plurality of pairs of transverse pressure hoses mounted aft on said deck for locating the longitudinal location of a plurality of different aircraft with respect to said shuttle depending upon which pair is selected, pressure actuated switches connected to each of said hoses, a selector switch operatively associated with said transverse pressure lines through said pressure switches, a selector indicator panel means operatively associated with said selector switch for indicating which transverse pressure switches are connected to said selector switch, electrical circuit means operatively associated with said selector switch and said pressure actuated switches, and an indicator light console operatively associated with said circuit means whereby an aircraft approaching said shuttle is directed to a position over said catapult.

6. In a launching system for launching aircraft as claimed in claim 5, said electrical circuit means having a series of relays, relay operated switches and blinker means operatively associated with said indicator light console.

7. In a launching system for launching aircraft as claimed in claim 5 wherein said indicator light console has a red light, a green light and an amber light operatively associated with said electrical circuit means whereby different indications are presented by said indicator console to indicate whether an aircraft is either too far right or left of said shuttle centerline or properly located in a longitudinal direction with respect to said shuttle.

8. In a launching system as claimed in claim 7 wherein said longitudinal pressure hoses comprises a first pressure hose which when compressed by an approaching aircraft's nose wheel will initiate a flashing green signal to indicate the plane is too far right and a second pressure hose which when compressed by said nose wheel will initiate a steady green signal to indicate the plane is approaching an on-center position, and wherein said pairs of transverse pressure hoses each comprise a first pressure hose means and a second pressure hose means located forwardly of said first pressure hose means, so that an approaching plane's aft wheels will first compress said first pressure hose means and thereby initiate a flashing red and green signal to indicate the plane is approaching its correct longitudinal position and as the plane continues to move forward said aft wheels will run off said first pressure hose means and compress said second pressure hose means and thereby initiate a steady red and green signal to indicate the plane is approximately correctly positioned in a longitudinal direction.

9. In a catapult launching system for launching aircraft, a catapult shuttle, longitudinal pressure lines having forward and rearward sections both located aft of said shuttle, the pressure lines in said forward section extending in the longitudinal direction, the pressure lines in said rearward section diverging from the longitudinal direction, pressure lines transverse to the longitudinal direction located adjacent said rearward section, a grounded pressure actuated switch connected to each of said pressure lines, a selector switch operatively associated with the pressure actuated switches which are connected to said transverse pressure lines, a selector indicator panel means operatively associated with said selector switch for indicating which transverse pressure switches are connected to said selector switch, a relay circuit means having a current source, said pressure actuated switches connected to said longitudinal pressure lines being operatively connected to said relay circuit means, said pressure actuated switches connected to said transverse pressure lines being operatively connected by means of said selector switch to said relay circuit means, and a light console connected to said relay circuit means, whereby when an aircraft compresses a pressure line a pressure switch is closed causing current to flow from said current source through said light console to ground thus indicating the position of an aircraft approaching said catapult shuttle.

10. In a launching system as claimed in claim 9 wherein separate lead lines connect said selector switch with said relay circuit means, said pressure actuated switches connected to said longitudinal pressure lines being connected to said separate lead lines, relays in said relay circuit, said separate lead lines being connected to said relays, said relays being connected to said current source, said console having a red light, a green light and an amber light, a blinker means in said circuit, whereby a flashing green or red light is illuminated when an aircraft is too far right or left of the centerline respectively, a steady green or red light is illuminated when an aircraft is approaching the centerline from the right or left respectively, a flashing red and green light is illuminated when an aircraft is initially approaching its proper longitudinal position and a steady red and green light is illuminated just before the aircraft reaches its proper longitudinal position.

References Cited in the file of this patent
UNITED STATES PATENTS

| 2,855,165 | Beauvais et al. | Oct. 7, 1958 |
| 2,879,350 | Howell | Mar. 24, 1959 |
| 2,979,694 | Lamberti | Apr. 11, 1961 |